United States Patent
Thielen et al.

(10) Patent No.: US 12,024,616 B2
(45) Date of Patent: Jul. 2, 2024

(54) METHOD OF PRODUCING THERMOPLASTIC ELASTOMERS AND POLYMER COMPOSITE OBTAINED THEREBY

(71) Applicant: Cabot Corporation, Boston, MA (US)

(72) Inventors: Alain Thielen, Thimister (BE); Marc B. Delvaux, Liege (BE); Eugene N. Step, Newton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 17/591,894

(22) Filed: Feb. 3, 2022

(65) Prior Publication Data
US 2022/0251340 A1    Aug. 11, 2022

Related U.S. Application Data

(60) Provisional application No. 63/147,912, filed on Feb. 10, 2021.

(51) Int. Cl.
| | | |
|---|---|---|
| *C08K 9/06* | (2006.01) | |
| *C08G 63/672* | (2006.01) | |
| *C08G 69/40* | (2006.01) | |

(52) U.S. Cl.
CPC .............. *C08K 9/06* (2013.01); *C08G 63/672* (2013.01); *C08G 69/40* (2013.01)

(58) Field of Classification Search
CPC ...... C08K 9/06; C08K 9/04; C08K 2201/006; C08K 3/36; C08G 63/672; C08G 69/40
See application file for complete search history.

(56) References Cited

U.S. PATENT DOCUMENTS

| | | | |
|---|---|---|---|
| 4,331,786 A | 5/1982 | Foy et al. | |
| 4,355,155 A | 10/1982 | Nelsen | |
| 6,833,428 B1* | 12/2004 | Kato | C08G 63/672 |
| | | | 528/274 |
| 2006/0009611 A1* | 1/2006 | Hayes | C08G 63/66 |
| | | | 528/272 |
| 2014/0355225 A1* | 12/2014 | Jordan, Jr. | C08G 18/7664 |
| | | | 524/871 |
| 2019/0352507 A1 | 11/2019 | Arrigoni et al. | |

FOREIGN PATENT DOCUMENTS

| | | |
|---|---|---|
| CN | 1775852 A | 5/2006 |
| FR | 3096053 A1 | 11/2020 |

OTHER PUBLICATIONS

Gelest, Organosilane-Modified Silica Nanoparticles, 2006, p. 1-3.*
The International Search Report and The Written Opinion of the International Searching Authority, or the Declaration of International Application No. PCT/US2022/015039, dated May 6, 2022.

* cited by examiner

*Primary Examiner* — Robert D Harlan

(57) ABSTRACT

A method of producing a thermoplastic elastomer includes providing a polyether composition comprising at least a first diol terminated polyether having a number average molecular weight of 400-6000 and up to 15 wt % of fumed silica having C1-C8 alkylsilyl groups or acrylate or methacrylate ester groups at its surface, combining the polyether composition with optional additional first polyether and either a) at least one dicarboxylic acid and at least one organic diol having a molecular weight less than 250 or b) at least one dicarboxylate terminated polyamide, to form a prepolymer composition, and allowing the prepolymer composition to polymerize to form a thermoplastic elastomer.

10 Claims, No Drawings

METHOD OF PRODUCING THERMOPLASTIC ELASTOMERS AND POLYMER COMPOSITE OBTAINED THEREBY

This application claims priority from U.S. Provisional Application No. 63/147,912, filed Feb. 10, 2021, the entire contents of which are incorporated herein by reference.

BACKGROUND OF THE INVENTION

1. Field of the Invention

This invention relates to processes for incorporating silica fillers into thermoplastic elastomers, in particular, thermoplastic polyether esters and thermoplastic polyether amides.

2. Description of the Related Art

Thermoplastic elastomers (TPEs) are an important class of polymers that combine the flexibility of elastomers and the processing ease of thermoplastics. The mechanical properties of TPEs such as thermoplastic polyether esters and thermoplastic polyether amides, are determined by their microstructure, in which hard and soft segments are chemically connected but spatially segregated into two phases. Such materials are used in a variety of applications, including hoses, pipes, yarns, molded parts, and automotive door and window profiles. CN1775852 describes thermoplastic polyether ester compositions in which silica is grafted with polyester oligomer and then combined with molten thermoplastic polyether ester in an extruder. However, it is desirable to break trade-offs in mechanical properties of thermoplastic polyether esters and thermoplastic polyether amides, such as between elongation at break and properties such as tear strength and hardness.

SUMMARY OF THE INVENTION

In one embodiment, a method of producing a thermoplastic elastomer includes providing a polyether composition comprising at least a first diol terminated polyether having a number average molecular weight of 400-6000 and up to 15 wt % of fumed silica having C1-C8 alkylsilyl groups or acrylate or methacrylate ester groups at its surface, combining the polyether composition with optional additional first polyether and either a) at least one dicarboxylic acid and at least one organic diol having a molecular weight less than 250 or b) at least one dicarboxylate terminated polyamide, to form a prepolymer composition, and allowing the prepolymer composition to polymerize to form a thermoplastic elastomer. Allowing may include adding a catalyst to the prepolymer composition. The fumed silica may have a surface area of 50 to 400 m2/g and/or may have C1-C3 alkylsilyl groups on the surface. The prepolymer composition may further include one or more surfactants, fillers, flame retardants, nucleating agents, solvents, antioxidants, lubricants, mold-release agents, dyes, pigments, plasticizers, or UV stabilizers. The amount of polyether in the thermoplastic elastomer may be from 20% to 80% as a percentage of total polymer.

In another embodiment, thermoplastic elastomer is produced according to any combination or subcombination of these options and may include up to 12 wt % of the fumed silica. The amount of polyether in the thermoplastic elastomer may be from 20% to 80% as a percentage of total polymer.

It is to be understood that both the foregoing general description and the following detailed description are exemplary and explanatory only and are intended to provide further explanation of the present invention, as claimed.

DETAILED DESCRIPTION OF THE INVENTION

In one embodiment, a method of producing a thermoplastic polyether ester or a thermoplastic polyether amide includes combining fumed silica with the precursor of a polyether component to form a silica-polyether dispersion. The silica-polyether dispersion is combined with a) at least one dicarboxylic acid and at least one low molecular weight diol or b) at least one polyamide oligomer, a catalyst, and optional additional polyether and allowed to polymerize. Preferably the fumed silica is hydrophobized using a surface treatment that leaves C1-C8 alkylsilyl groups and/or acrylate or methacrylate esters on the surface.

Fumed silica is typically produced via a pyrogenic process in which a gaseous feedstock comprising a fuel, e.g., methane or hydrogen, oxygen, and a volatile silicon compound is fed into a burner. Water formed by the combustion of the fuel in oxygen reacts with the volatile silicon compound either in liquid or gaseous form to produce silicon dioxide particles. These particles coalesce and aggregate to formed fumed silica. Non-limiting examples of fumed silicas include CAB-O-SIL® fumed silica available from Cabot Corporation, HDK® fumed silica products available from Wacker Chemie AG, and AEROSIL® fumed silica available from Evonik Industries, Essen, Germany.

During formation of the thermoplastic elastomer, it is desirable to balance the properties of the formulation to coordinate the formation of hydrogen bonds between the silica and the polymer with the formation of the polymer itself. Increasing the surface area of the silica increases the available surface area to interact with the polymer. Thus, in preferred embodiments, the fumed silica used herein has a surface area, as measured by nitrogen adsorption (ASTM D1993), of at least 50 $m^2/g$, for example, at least 90 $m^2/g$, at least 150 $m^2/g$, at least 175 $m^2/g$, at least 200 $m^2/g$, or from 150 $m^2/g$ to 300 $m^2/g$.

As produced, fumed silica is hydrophilic, with multiple Si—OH groups on the surface. These silanol groups form non-covalent bonds with the oxyalkylene groups of polyethers and the carboxyl groups of the polyamides and polyesters. These interactions influence the development of crystallinity in the polymer, especially of the hard segments, and influences the microstructure and reinforcement of the final polymer. In combination with the thixotropy provided by the branched structure of the silica, the interaction of the silanol groups with hydrophilic components of the prepolymer formulation may also increase viscosity. It has been unexpectedly found that fumed silica that is hydrophobized with an agent that leaves short alkylsilyl groups on the surface reduces viscosity of the prepolymer components in comparison to longer alkylsilyl groups while still allowing the silica to modify crystallization behavior and enhance mechanical properties in thermoplastic polyether amides and esters.

Suitable surface treatments leave C1-C8, preferably C1-C3, alkylsilyl groups on the surface, for example, trimethylsilyl, dimethylsilyl, ethylsilyl, alkylene silyl, vinyl silyl, or methylethylsilyl groups. Alternatively or in addition, the surface treatment may leave a acrylate ester, or methacrylate ester group at the surface. Typically, such an ester group is linked to the silyl group by an alkyl linker which may have 1-6 carbons. The silyl group may be attached to the surface of the fumed silica by one, two, or three siloxane bonds or may be linked to one or two adjacent alkylsilane groups via a siloxane bond. Thus, the fumed silica may be hydrophobized with a silazane such as hexamethyl disilazane or an alkylsilane such as dimethyldichlorosilane, methyltrimethoxysilane, methyl trichlorosilane, methyltrimethoxysilane, methyltriethoxysilane, dimethyldimethoxysilane, dimethyldiethoxysilane, trimethylchlorosilane, trimethylmethoxysilane, trimethylethoxysilane, ethyltriethoxysilane, ethyltrichlorosilane, ethyltrimethoxysilane, propyltrichlorosilane, propyltrimethoxysilane, propyltriethoxysilane, ethylmethyldichlorosilane, and other C1-C8 linear and branched alkyl silanes. The appropriate length of alkyl chain in the alkyl silyl group or alkyl linker will vary with the hydrophilic/lipophilic balance of the polyol. The silica particles should not be so hydrophobic that they form a separate network in the polyol, thereby increasing viscosity, rather than primarily interacting with the polyol molecules.

Thermoplastic polyether esters, also termed thermoplastic polyether co-polyesters or thermoplastic polyetherester elastomers, are block copolymers that contain both hard, inflexible segments, or blocks, and soft segments. The repeating units of the hard segments are typically prepared with at least one low molecular weight (MW) organic diol and at least one dicarboxylic acid or ester. The low MW diol may be an acyclic, cycloaliphatic, or aromatic alkylene diol and typically contains 2-15 carbon atoms, e.g., 2-6 or 2-4 carbon atoms. Exemplary low MW diols include ethylene glycol, propylene glycol, 1,3-trimethylene glycol, butylene glycol, e.g., 1,4-butylene glycol and isobutylene glycol, 1,4-pentamethylene glycol, 2,2-dimethyl trimethylene glycol, 1,6-hexamethylene glycol, 1,8-octamethylene glycol, 1,10-decamethylene glycol, dihydroxycyclohexane, 1,4-cyclohexylene dimethanol, resorcinol, hydroquinone, 1,5-dihydroxynaphthalene, bis(p-hydroxy)diphenyl, bis(p-hydroxy phenyl)methane, bis(p-hydroxyphenyl)propane, and combinations of two or more of these.

The dicarboxylic acid may be an aromatic, aliphatic, or cycloaliphatic dicarboxylic acid. Exemplary dicarboxylic acids include terephthalic acid, isophthalic acid, 2,6-naphthalenedicarboxylic acid, 4,4'-biphenyldicarboxylic acid, bibenzoic acid, substituted dicarboxy compounds with two benzene nuclei such as bis(p-carboxy phenyl)methane, ethylene bis p-benzoic acid, 1,4 tetramethylene bis (p-oxybenzoic) acid, ethylene bis (p-oxybenzoic) acid, 1,3-trimethylene bis (p-oxybenzoic) acid, p-oxy-1,5-naphthalene dicarboxylic acid, 2,7-naphthalenedicarboxylic acid, 2,6-naphthalenedicarboxylic acid, 4,4,'-sulfonyl dibenzoic acid and C1-C12 alkyl and ring substitution derivatives thereof, such as halo, alkoxy, and aryl derivatives. Combinations of dicarboxylic acids may be used as well.

Typical polyester (hard) segments include but are not limited to poly(butylene terephthalate) (PBT), poly(ethylene terephthalate) (PET), poly(trimethylene terephthalate) (PTT), poly(butylene 2,6-naphthalene dicarboxylate, D,L-lactide, PBT copolymers with unsaturated alkylene dicarboxylates, and poly(butylene-co-isophthate).

The repeating units of the soft segments are typically amorphous polyethers with a number average molecular weight of 400-6000, e.g. 400-4000 or 500-2500, and prepared with alkylene oxides of 2-6 carbon atoms, e.g., 2-4 carbon atoms, including mixtures of alkylene oxides of different lengths. Exemplary polyethers include poly(ethylene oxide), poly(propylene oxide), e.g., poly(1,2-propylene oxide) and poly(1,3-propylene oxide), poly(tetramethylene oxide), polytetrahydrofuran, poly(3-alkyl tetrahydrofuran, e.g., poly(3-methyltetrahydrofuran), poly(hexamethylene oxide), poly(neopentylene oxide-co-tetramethylene oxide), polyethers obtained by oxyethylation of bisphenols, e.g., bisphenol A, and combinations of these. Diol-terminated versions of these polyalkylene oxides may be used to incorporate the soft segments into the thermoplastic polyether ester.

Polyether esters may produced by combining the fumed silica, low MW diol, the dicarboxylic acid, the polyether, and a catalyst and conducting polycondensation in any manner known to those of skill in the art. Because the silica does not provide reinforcement on its own, small amounts, as low as 0.1 wt %, for example, from 0.1 wt % to 15 wt %, for example, 0.5 wt % to 10 wt % or 1 wt % to 7 wt %, may be employed. Any catalyst known to those of skill in the art for the production of thermoplastic polyether esters may be employed, e.g., tetrabutyl orthotitanate or tetrabutyltitanate. An antioxidant may be included as well, e.g., tetrakis (methylene(3,5-di-t-butyl-4-hydroxyphenylhydro-cinnamate))methane (available as Irganox 1010 from BASF) and 1,3,5-trimethyl-2,4,6-tris(3,5-di-tert-butyl-4-hydroxybenzyl)benzene (available as Irganox 1330 from BASF). Other catalysts and catalyst mixtures known to those of skill in the art may also be employed. Suitable thermoplastic polyether esters include those described in U.S. Pat. Nos. 6,764,753, 5,731,380, 4,355,155, 8,329,269, US20190162244, EP1545857, and WO2012119057, the contents of which are incorporated herein by reference, and other thermoplastic polyether esters known to those of skill in the art.

The resulting silica-filled thermoplastic polyether ester may be employed in a variety of end use applications, including but not limited to automotive applications (e.g., boots, bellows, air ducts, air bag covers), wire and cable applications (e.g., jacketing, hoses, tubes, covers), fiber optic covers, protective coatings, and medical devices.

Thermoplastic polyamide polyethers, also termed thermoplastic polyether amides, are block copolymers including soft polyether segments and more rigid polyamide blocks. Suitable polyether segments include those suitable for use in thermoplastic polyester polyethers as described above and also ethoxylated primary amines. The polyethers are typically —OH terminated (i.e., diols) for incorporation into the block copolymer. Exemplary ethoxylated primary amines include those having the formula $H(OCH_2CH_2)_m$—N$(CH_2CH_2O)_n$—H, in which m and n are between 1 and 20 and x is between 8 and 18, available, for example, from Arkema under the Noramox name. Alternatively or in addition, the soft blocks of a thermoplastic polyamide polyether may include polyesters including dimerized fatty acids.

The polyamide blocks may result from the condensation of a dicarboxylic acid and a diamine. Suitable dicarboxylic acids include aliphatic, cycloaliphatic, and aromatic dicarboxylic acids, for example, having 4 to 36, e.g., 6-18 carbon atoms. Exemplary aromatic diacids include those listed above in connection with thermoplastic polyester polyethers. Exemplary aliphatic and cycloaliphatic diacids include butanedioic acid, adipic acid, suberic acid, azelaic acid, sebacic acid, dodecanedicarboxylic acid, myristic acid, tetradecanedicarboxylic acid, hexadecanedicarboxylic acid, octadecanedicarboxylic acid, dimerized fatty acids, and 1,4-cyclohexyldicarboxylic acid, and combinations of these. Preferably, the polyamide block is diacid terminated.

Suitable diamines include aliphatic, cycloaliphatic, and aromatic diamines, for example, having 2-20 carbon atoms, e.g., 6-15 carbon atoms. Exemplary diamines include tetramethylenediamine, hexamethylenediamine, 1,10-decamethylenediamine, dodecamethylenediamine and trimethylhexamethylenediamine, isomers of any of bis(4-aminocyclohexyl) methane (BACM), bis(3-methyl-4-aminocyclohexyl) methane (BMACM), and 2,2-bis(3-methyl-4-aminocyclohexyl) propane, isophoronediamine, 2,6-bis(aminomethyl) norbornane and piperazine (Pip), and combinations of any of the above diamines.

Alternatively or in addition, the polyamide block may result from condensation of at least one alpha, omega-aminocarboxylic acid and/or at least one lactam, for example, containing 6-12 carbon atoms, e.g., caprolactam, oenantholactam, lauryllactam, aminocaproic acid, 7-aminoheptanoic acid, 11-aminoundecanoic acid, or 12-aminododecanoic acid. Alternatively or in addition, the polyamide may result from condensation of at least one alpha, omega-aminocarboxylic acid and/or lactam with at least one diamine and/or at least one dicarboxylic acid. Diacid terminated polyamide blocks may be achieved by condensation in the presence of a dicarboxylic acid such as adipic acid.

Suitable polyamide blocks also include PA 4.6, PA 4.9, PA 4.10, PA 4.12, PA 4.14, PA 4.16, PA 4.18, PA6, PA 6.6, PA 6.9, PA 6.10, PA 6.12, PA 6.14, PA 6.16, PA 6.18, PA 9.12, PA 10.6, PA 10.9, PA 10.10, PA 10.12, PA 10.13, PA 10.14, PA 10.16, PA 10.18, PA BMACM.6, PA BMACM.9, PA BMACM.10, PA BMACM.12, PA BMACM.14, PA BMACM.16, PA BMACM.18, PA BACM.6, PA BACM.9, PA BACM.10, PA BACM.12, PA BACM.14, PA BACM.16, PA BACM.18, PA Pip.6, PA Pip.9, PA Pip.10, PA Pip.12, PA Pip.14, PA Pip.16, PA Pip.18, PA 11, PA 12, PA 6, PA 6.6/6, PA 6.6/Pip.10/12, PA 6.6/6.10/11/12, PA 10.10/11, PA 6/11, PA 11/12, PA 10.10/1.2, PA 10.10/10.14, PA 11/10.36, PA 11/6.36, PA 10.10/10.36, PA 6.10/11, PA10.12/11, PA 10.10/11/12, PA 6.10/10.10/11, PA 6.10/6.12/11 and PA 6.10/6.12/10.10. Typical polyamide blocks have a molecular weight of 500 to 5000 g/mol but the molecular weight may be adjusted to tailor mechanical properties such as hardness.

Silica filled thermoplastic polyamide polyethers may be produced by combining the silica, diacid terminated polyamide oligomers, and polyether diol and performing polycondensation in the presence of a catalyst. In certain embodiments, the silica is first combined with the polyether diol in an amount from 0.1 wt % to 15 wt %, for example, 0.5 wt % to 10 wt % or 1 wt % to 7 wt %. Typically, polycondensation is performed at high temperature, e.g., 100-300° C., for example, 200-250° C., under vacuum. Suitable catalysis include tetraalkyl orthotitanates such as those mentioned above for polycondensation of thermoplastic polyether esters. Any suitable antioxidant known to those of skill in the art for production of thermoplastic polyamide polyethers, e.g. Irganox 1010 or Irganox 245 antioxidant, may also be employed. Exemplary thermoplastic polyamide polyethers and methods of producing them include those disclosed in WO2010089902, U.S. Pat. Nos. 4,331,786, 4,230,838, and 4,252,920, the contents of which are incorporated herein by reference, and other thermoplastic polyester amides known to those of skill in the art.

Silica-filled thermoplastic polyether amides may be used in a variety of end use applications, including ski bindings and boots, shoe outsoles, catheters and other medical devices, high speed belts, tie bends for hook and loop fasteners, and breathable films.

For both thermoplastic polyether amides and thermoplastic polyether esters, additional components known to those of skill in the art for use in such materials may also be employed. Exemplary additives include but are not limited to surfactants, fillers, flame retardants, nucleating agents, solvents, antioxidants, lubricants, mold-release agents, dyes, pigments, plasticizers, and UV stabilizers. The ratio of polyether to either polyamide or polyester may be from 80/20 to 20/80 on a weight basis. Thus the desired amount of silica in the final polymer may be easily tailored by adjusting the silica loading in the polyether and the amount of additional neat polyether added to the formulation. Alternatively or in addition, the silica may be combined with the polyester or polyamide component prior to combination with the polyether. Suitable amounts of silica in the final polymer formulation may range from 0.02 to 12 wt % silica, for example, from 0.05 to 10 wt %, from 0.1 to 7 wt %, from 0.5 to 5 wt % or from 1 to 4 wt %.

The present invention will be further clarified by the following examples which are intended to be only exemplary in nature.

EXAMPLES

Example 1

Silica (either fumed silica having a surface area of about 90 $m^2/g$ and treated with hexamethyldisilazane (HMDZ) to leave trimethylsilyl groups at the surface or fumed silica having a surface area of 220 $m^2/g$ treated with dimethyldichlorosilane (DMD) to leave dimethylsilyl groups at the surface) is dispersed in poly(tetramethylene ether)glycol (PTMG, Mn=1000) at 10 wt % in a FlackTek DAC600 Speedmixer. A thermoplastic polyether ester is produced by melt transesterification and subsequent polycondensation of PTMG, dimethyl terephthalate (DMT), and 1,4-butanediol (BDO), with 0.2 wt % tetrabutyl titanate (TBT) as a catalyst and 0.5 wt % Irganox 1010 as antioxidant, using the procedure described in Gabrielse, et al., Macromolecules (2001) 34:1685. Polycondensation is performed at a temperature of 250° C. under vacuum for 200 min. The formulations given in Table 1 below yield different amounts of silica reinforcement but result in a TPEE with 60% (weight basis) polyether segments. After polymerization, the resulting polymer is extruded as a strand and pelletized. Polymer granules are dried at 100° C. for two hours, followed by additional drying for five hours at 140° C. The resulting material is expected to have superior tensile and hardness properties in comparison to the silica-free control and in comparison to similar formulations prepared by melt-mixing the silica free control with dry silica.

TABLE 1

| Component | Silica concentration in final polymer (wt %) | | | |
|---|---|---|---|---|
| | 0 | 0.6 | 2.85 | 5.5 |
| DMT | 30 | 30 | 30 | 30 |
| BDO | 21.3 | 21.3 | 21.3 | 21.3 |
| PTMG | 47.6 | 42.2 | 20.6 | 0 |
| Silica-PTMG dispersion | 0 | 6 | 30 | 52.9 |

Example 2

11-aminoundecanoic acid is subjected to polycondensation in the presence of adipic acid to prepare a dicarboxylic acid terminated polyamide having a molecular weight (Mn) of 2000. Each of the silicas from Example 1 is dispersed in polyethylene glycol (PEG, Mn=1000) at 10 wt % in a FlackTek DAC600 Speedmixer. A thermoplastic polyether amide is produced by subsequent polycondensation of polyethylene glycol and the 11-dicarboxylic polyamide in the amounts shown in Table 2 below, with 1.5 g tetrabutylorthotitanate as a catalyst, using the procedure described in Example 1 of U.S. Pat. No. 4,230,838. Polycondensation is performed at a temperature of 260° C. under vacuum for seven hours. The resulting material is expected to have superior tensile and hardness properties in comparison to the silica-free control and in comparison to similar formulations prepared by melt-mixing the silica free control with dry silica.

TABLE 2

| Component (g) | Silica concentration in final polymer (wt %) | | | |
|---|---|---|---|---|
| | 0 | 0.6 | 2 | 3.4 |
| Polyamide | 310 | 310 | 310 | 310 |
| PEG | 146 | 121 | 62.3 | 0 |
| Silica-PEG dispersion | 0 | 27.5 | 93 | 162 |

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of producing a thermoplastic elastomer, comprising:
    providing a polyether composition comprising at least one diol-terminated polyether having a number average molecular weight of 400-6000 and up to 15 wt % of fumed silica having C1-C8 alkylsilyl groups, acrylate ester, or methacrylate ester groups at the surface of said fumed silica;
    combining the polyether composition with either a) at least one dicarboxylic acid and at least one organic diol having a molecular weight less than 250 or b) at least one dicarboxylate terminated polyamide, to form a prepolymer composition; and
    allowing the prepolymer composition to polymerize to form a thermoplastic elastomer.

2. The method of claim 1, wherein allowing comprises adding a catalyst to the prepolymer composition.

3. The method of claim 1, wherein the fumed silica has a surface area of 50 to 400 $m^2/g$.

4. The method of claim 1, wherein the fumed silica has C1-C3 alkylsilyl groups on the surface.

5. The method of claim 1, wherein the prepolymer composition further comprises one or more surfactants, fillers, flame retardants, nucleating agents, solvents, antioxidants, lubricants, mold-release agents, dyes, pigments, plasticizers, or UV stabilizers.

6. The method of claim 1, wherein the amount of polyether in the thermoplastic elastomer is from 20% to 80% as a percentage of total polymer.

7. A thermoplastic elastomer produced according to the method of claim 1.

8. The thermoplastic elastomer of claim 7, comprising up to 12 wt % of the fumed silica.

9. The thermoplastic elastomer of claim 7, wherein the amount of polyether in the thermoplastic elastomer is from 20% to 80% as a percentage of total polymer.

10. The method of claim 1, wherein combining further comprises combining the polyether composition with additional diol-terminated polyether having a number average molecular weight of 400-6000.

* * * * *